Sept. 30, 1941.    L. RADUE    2,257,572
ENSILAGE SPREADER
Filed May 4, 1940
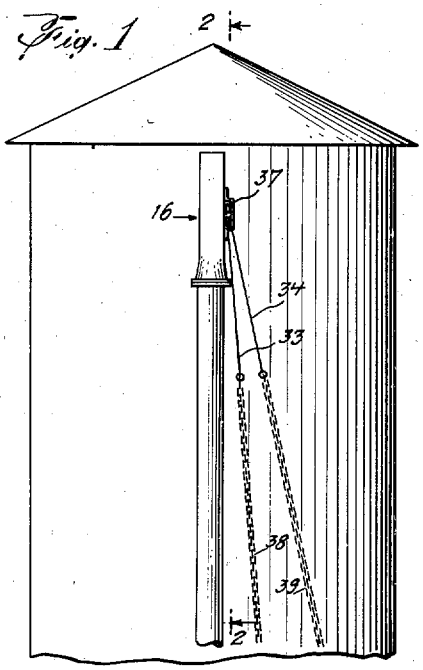
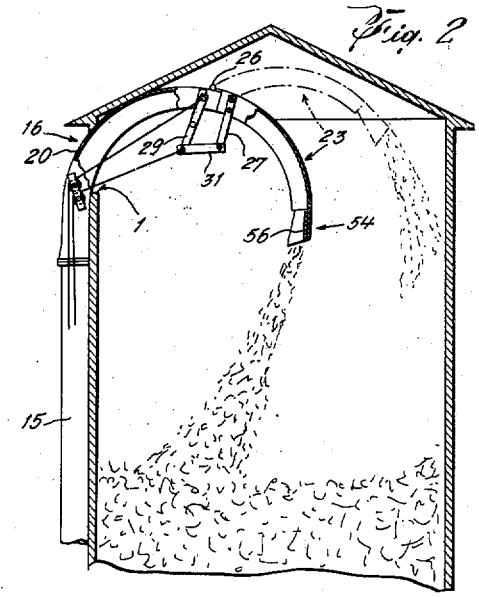
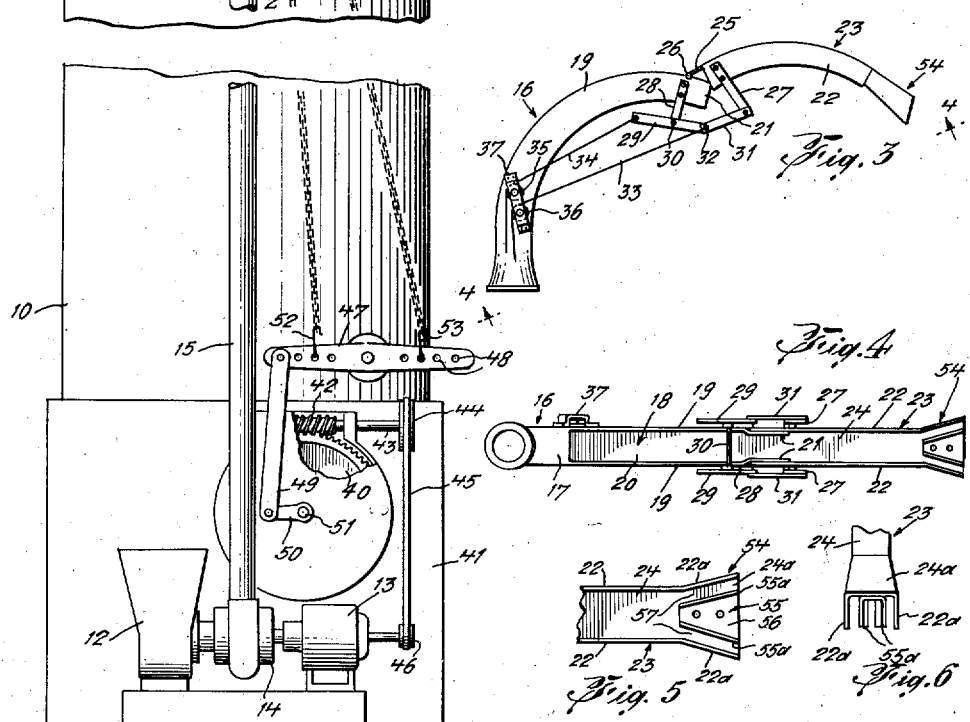
INVENTOR.
LOUIS RADUE
BY   J. Ledermann
ATTORNEY Patented Sept. 30, 1941

2,257,572

UNITED STATES PATENT OFFICE 2,257,572

ENSILAGE SPREADER

Louis Radue, Casco, Wis.

Application May 4, 1940, Serial No. 333,293

1 Claim. (Cl. 302—60)

This invention relates to the handling of ensilage, and consists essentially of a device mounted on or adjacent the corn or hay cutter and actuated by the motor of the latter to move the spout of the ensilage blower outlet synchronously back and forth at the top of the silo, in order to evenly spread the ensilage being blown into the silo. Without such a device, while filling the silo the corn and hay come down on one spot and the leaves fly to one side and the cobs to another, forming a big pile on the side or at the middle. The present invention overcomes these disadvantages and results in an even spread of the ensilage throughout.

The above and other objects will become apparent in the accompanying drawing, in which characters of reference refer to similarly-numbered parts in the accompanying description below. This drawing serves to illustrate one manner in which the purposes of the invention may be carried out, and it is not desired to limit the construction of the invention in any way to the specific structural details shown.

Referring briefly to the drawing,

Figure 1 is an elevational view of a silo, showing the cutter and blower and the spout-moving mechanism in relation thereto.

Figure 2 is a fragmentary cross-sectional view taken on the line 2—2 of Figure 1, illustrating the possible extreme positions of the spout.

Figure 3 is a side elevational view of the fixed spout and the movable spout secured thereon, showing the latter in its uppermost position.

Figure 4 is a view of the underside of Figure 3, taken in the direction of the arrows 4—4 of Figure 3.

Figure 5 is a bottom view of the end of the movable spout, showing the cap secured thereon.

Figure 6 is an end view of the spout.

Referring in detail to the drawing, the numeral 10 indicates a silo having an inlet at the top under the roof, shown at 11. A hopper 12, having a corn cutter, not shown, therein, is mounted at the base of the silo. A motor 13 has its axle extending into the hopper and through an intermediate blower 14, the corn cutter and the blower being operated simultaneously by the motor. The blower outlet leads into the vertical pipe 15 extending up the side of the silo, and ground material is sucked from the hopper into the blower and blown up the pipe 15. The particular arrangement of the motor, blower and cutter illustrated and just described is, of course, no part of the present invention, and any other suitable arrangement may be utilized.

The fixed curved spout 16 is secured to the top of the pipe 15 and enters the silo through the opening 11. For the greater portion of its length, the fixed spout 16 is rectangular in cross-section above the plane of union with the pipe 15. The underside wall 17 thereof is cut away from the outlet or end of the spout to a point intermediate its length, leaving an elongated opening 18 through the bottom wall 17. The top wall of the spout 16 is indicated at 20, and the two side walls at 19. The extremities 21 of the side walls 19 are brought together slightly so that the rear ends of the side walls 22 of the movable spout 23 may register thereagainst when the latter is in its lowermost position, as will hereinafter become apparent. The top wall 24 of the movable or extension spout 23 has a tongue 25 extending rearward therefrom, and at its extremity this tongue is hingedly attached to the top wall 20 of the fixed spout 16, as shown at 26.

A pair of rigid parallel arms 27 extend downward from the side walls 22 of the spout 23, near the hinged end thereof, and a similar pair of arms 28 extend downward from the spout 16 adjacent the hinge 26. A simple lever 29, formed of a pair of identical parallel members bearing the same reference numeral, has its said arms rigid on the ends of a pin pivotally mounted in the ends of the arms 28, as shown at 30. A pair of identical links 31 are pivoted at one end in the ends of the arms 27 and at the other end to the adjacent ends of the levers 29. A flexible wire 33 is secured to the pivot 32 at the common point between one lever 29 and one link 31. Similarly, a wire 34 is secured in the other end of that same lever 29. Both wires 33 and 34 are trained about pulleys 35 and 36, respectively, secured in a bracket 37 to the spout 16. Chains 38 and 39 are secured to the ends of the wires 33 and 34, respectively.

A vertical gear 40 is mounted on a rigid support such as a wall 41, and has in mesh therewith a worm 42 whose shaft 43 has a pulley 44 on its end. A belt 45 connects the pulley 44 with a pulley 46 on the motor shaft. A rocker 47 is pivotally secured above the worm 42, and is provided with a plurality of longitudinally spaced holes 48 therein. A connecting rod 49 is pivoted at one end to one end hole 48 of the rocker 47 and at the other end to the end of a crank 50 extending from the shaft 51 of the gear 40. Hooks 52 and 53 are secured to the ends of the chains 38 and 39, respectively, and these hooks are secured in any pair of holes 48 of the rocker 47, the hook 52 being engaged in any hole 48 to the left (Figure 1) of the rocker fulcrum and the hook 53 being engaged in any hole 48 to the right of the fulcrum. It is apparent that rotation of the motor, in addition to operating the cutter and blower above-mentioned, also causes rocking of the rocker 47 in an obvious manner.

The aforesaid rocking movement of the rocker obviously first pulls the chain 38 while slackening the chain 39, and then reverses and tautens the chain 39 while loosening the chain 38. This behavior of the chains is relatively a slow movement owing to the gear-worm ratio provided, so that the wires 33 and 34 gradually swing the levers 29 from the position shown in Figure 2 to the position shown in Figure 3, with consequent movement of the extension spout 23 from the position shown in full lines in Figure 2 to that shown in Figure 3 and to that shown in broken lines in Figure 2, through the medium of the links 31, in an obvious manner. Thus, while the motor 13 is running, the extension spout 23 keeps moving back and forth through the arc of its travel about the hinge 26, and it thereby varies the direction at which the incoming ensilage is directed into the silo, as before-mentioned.

In order to provide a lateral diverging means for the incoming ensilage, a spreader cap 54 is provided on the end of the spout 23; this cap may be formed more or less integrally with the walls of the spout 23, as shown, or as a separate and detachable cap. As shown, the top wall 24 is widened in swallow tail fashion at its end 24a, and the side walls 22a on the said widened end of the top wall are spread funnel-fashion. An auxiliary member 55, of the same form as the widened top wall 24a and the spread side walls 22a, but of smaller dimensions, has its top wall 56 riveted or otherwise secured against the underside of the top wall 24a and has its spreading side walls 55a positioned in spaced-apart relationship with the walls 22a, thus providing diverging channels 57 at the end of the spout 23, which serve to spread the exiting ensilage to both sides of the silo. Thus, in addition to the back and forth spreading of the ensilage achieved by the movement of the spout 23, a lateral spreading is provided by the cap 54.

It is now apparent that the objects of the invention set forth above have been achieved by the device illustrated and described, so that a well distributed accumulation of ensilage is attained within the silo. Obviously, modifications in form and structure may be made without departing from the spirit and scope of the invention.

It is to be noted that the length of the arc through which the movable spout 23 swings, may be varied by changing the holes 48 in which the hooks 52 and 53 are inserted.

I claim:

A stacker comprising a blower pipe, a movable spout pivotally mounted on the end of said pipe, a rigid arm on said pipe and a rigid arm on said spout, a simple lever fulcrumed on said first-named arm, a link pivoted at one end to said second-named arm and at the other end to one end of said lever, cables connected to the ends of said lever, a rocker arm, the other ends of said cables being connected to said rocker arm at opposite points thereon with respect to the fulcrum of said rocker arm, motor means having a motor shaft, a blower actuated by said motor shaft and having its outlet entering into said pipe, a gear, a worm in mesh with said gear, means partly on said motor shaft and partly on said worm for rotating said worm by said motor shaft, a crank on said gear, a connecting rod pivoted at one end to said crank and at the other end to said rocker arm.

LOUIS RADUE.